(12) United States Patent
Chen et al.

(10) Patent No.: US 7,889,492 B2
(45) Date of Patent: Feb. 15, 2011

(54) VIBRATION DAMPENING STRUCTURE FOR DISK DRIVE

(75) Inventors: Yun-Lung Chen, Taipei Hsien (TW); Pei-Bin Luo, Shenzhen (CN); Bao Shen, Shenzhen (CN)

(73) Assignees: Hong Fu jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 137 days.

(21) Appl. No.: 12/422,351

(22) Filed: Apr. 13, 2009

(65) Prior Publication Data

US 2010/0103607 A1 Apr. 29, 2010

(30) Foreign Application Priority Data

Oct. 24, 2008 (CN) .......................... 2008 2 0302539

(51) Int. Cl.
*H05K 7/00* (2006.01)
*H05K 7/16* (2006.01)
*H05K 5/00* (2006.01)
*A47B 88/00* (2006.01)
*A47F 7/00* (2006.01)

(52) U.S. Cl. .................. 361/679.36; 361/727; 361/725; 361/679.35; 361/679.39; 312/332.1; 211/26

(58) Field of Classification Search . 361/679.31–679.4, 361/679.55–679.6, 724–727; 312/223.1, 312/223.2; 211/26; 439/679.31–679.4, 679.55–679.6, 439/724–727; 165/104.33; 369/75.11, 75.21, 369/76, 77.11, 77.21, 78, 79, 80, 81, 82; 206/701

See application file for complete search history.

(56) References Cited

U.S. PATENT DOCUMENTS

| 6,771,496 | B1 * | 8/2004 | Wu ........................ 361/679.58 |
| 7,327,565 | B2 * | 2/2008 | Chen et al. ............. 361/679.33 |
| 2005/0195564 | A1 * | 9/2005 | Peng et al. .................. 361/685 |

* cited by examiner

*Primary Examiner*—Jayprakash N Gandhi
*Assistant Examiner*—Jerry Wu
(74) *Attorney, Agent, or Firm*—D. Austin Bonderer

(57) ABSTRACT

A vibration dampening structure for a disk drive includes a bracket for receiving the disk drive and an elastic peg for dampening vibration of the disk drive. The bracket includes a pair of side panels for receiving the disk drive therebetween. An elastic clamp is formed on each side panel. A hole is defined in the clamp. The elastic peg includes a flexible head portion abutting the disk drive, and a handle portion extending into the hole. The head portion is configured for buffering the disk drive in an inner side of the bracket. The handle portion is capable of being pulled to move the head portion and the clamp away from the disk drive for disengaging the elastic peg from the disk drive.

19 Claims, 6 Drawing Sheets

VIBRATION DAMPENING STRUCTURE FOR DISK DRIVE

BACKGROUND

1. Technical Field

The present invention relates to vibration dampening structures and, particularly, to a vibration dampening structure for a disk drive in a computer.

2. Description of Related Art

Usually, disk drives are secured in a computer. The disk drives are conventionally secured to the computer by a plurality of screws. However, the disk drives will vibrate and produce noise when running, so it is important to stably secure the disk drives in the computer.

What is needed, therefore, is to provide a vibration dampening structure for a disk drive, having a simple structure and is easy to use.

DETAILED DESCRIPTION

Figure 1:
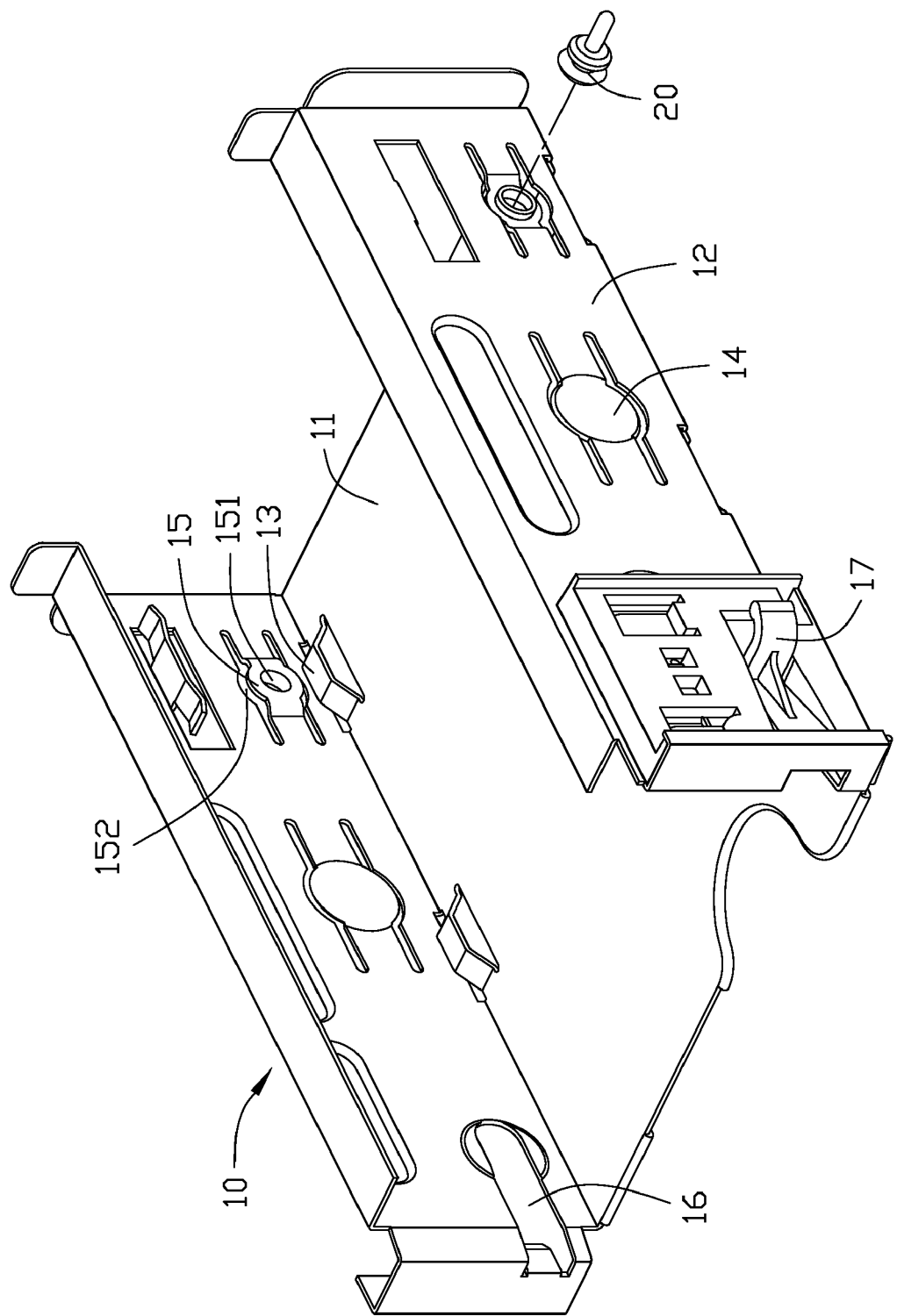
FIG. 1 is an isometric view of an embodiment of a vibration dampening structure for a disk drive, the vibration dampening structure including a bracket and an elastic peg.
Figure 2:
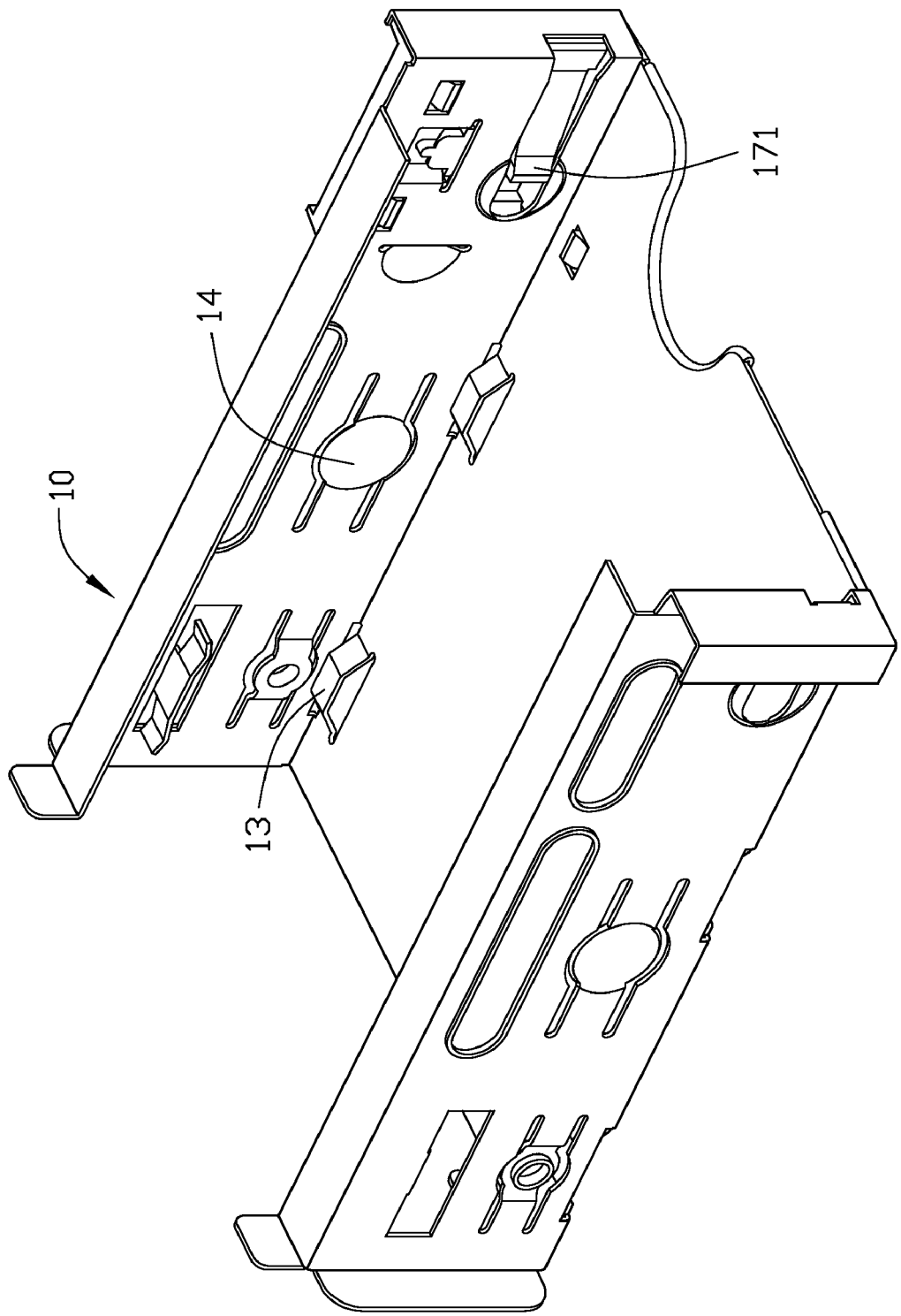
FIG. 2 is an isometric view of the bracket of FIG. 1, but viewed from another aspect.

Referring to FIG. 1 and FIG. 2, an embodiment of a vibration dampening structure for a disk drive includes a bracket 10 for mounting the disk drive to dampen vibration and an elastic peg 20 for fixing the disk drive in the bracket 10 firmly.

The bracket 10 has a bottom panel 11 and substantially parallel side panels 12 extending substantially perpendicularly from two sides of the bottom panel 11. The bottom panel 11 is punched towards an inner surface of the bracket 10 to form two pairs of elastic supports 13. Each support 13 may be curved. An elastic protrusion 14 may be formed on a middle portion of each side panel 12. The protrusion 14 may be circular. Each side panel 12 is punched towards an inner side to form a clamp 15 to clamp the elastic peg 20. A pair of substantially parallel grooves 152 is defined in opposite sides of the clamp 15 to enhance an elasticity of the clamp 15. A hole 151 is defined in a middle portion of the clamp 15. A guide way 16 is formed on the side panel 12 at a front side of the side panel 12. A fixing member 17 is formed on the side panel 12 opposite to the guide way 16. The fixing member 17 has an elastic resisting portion 171 protruding from the side panel 12.

Figure 3:
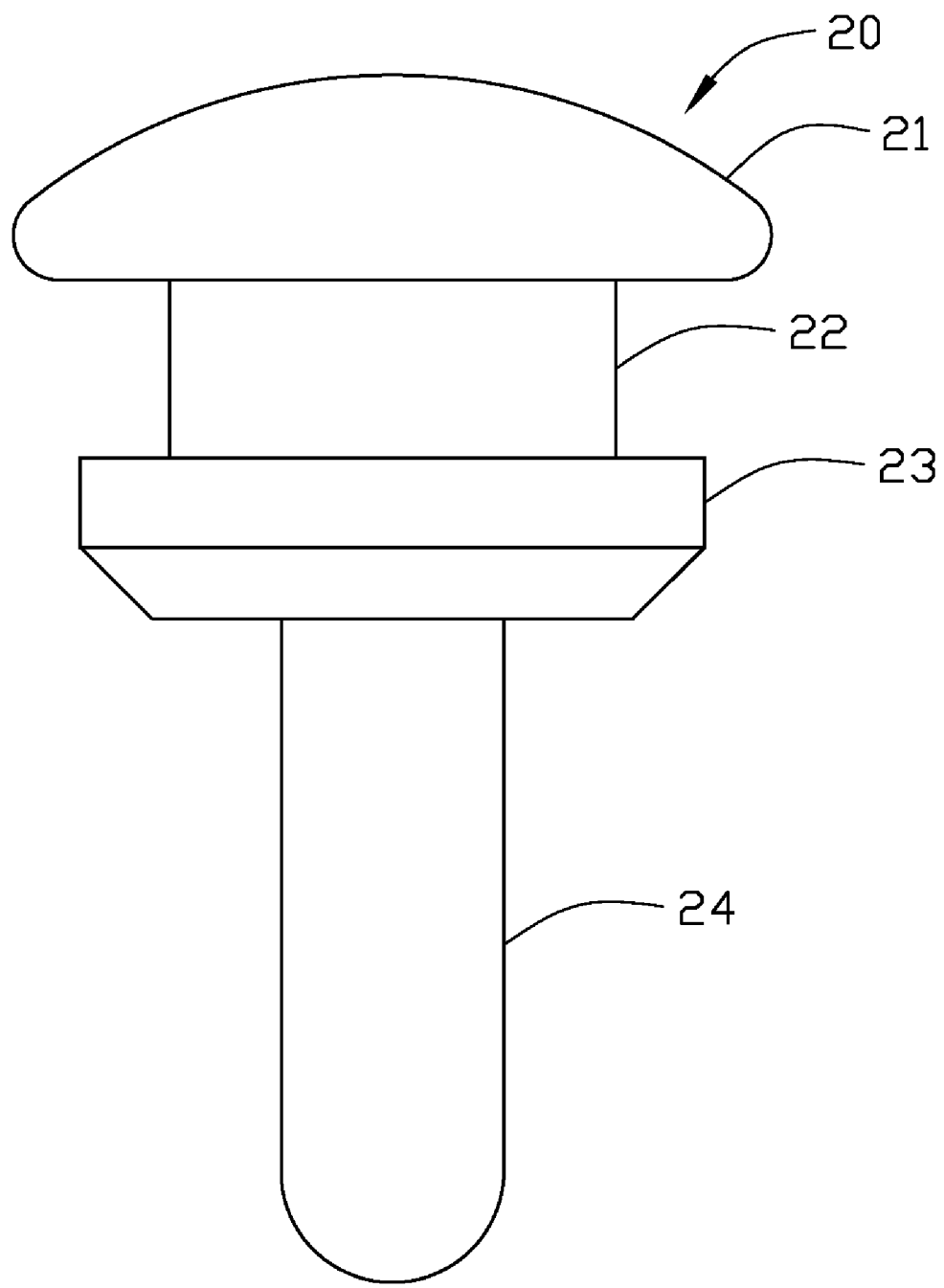
FIG. 3 is an isometric view of the elastic peg of FIG. 1.

Referring also to FIG. 3, the elastic peg 20 includes a head portion 21, a neck portion 22 connecting with the head portion 21, a flange portion 23 connecting with the neck portion 22, and a handle portion 24 connecting with the flange portion 23. The head portion 21 may be convex or spherical-shaped. A width of the head portion 21 is larger than a diameter of the hole 151 of the clamp 15. A width of the neck portion 22 is substantially equal to the diameter of the hole 151.

Figure 4:
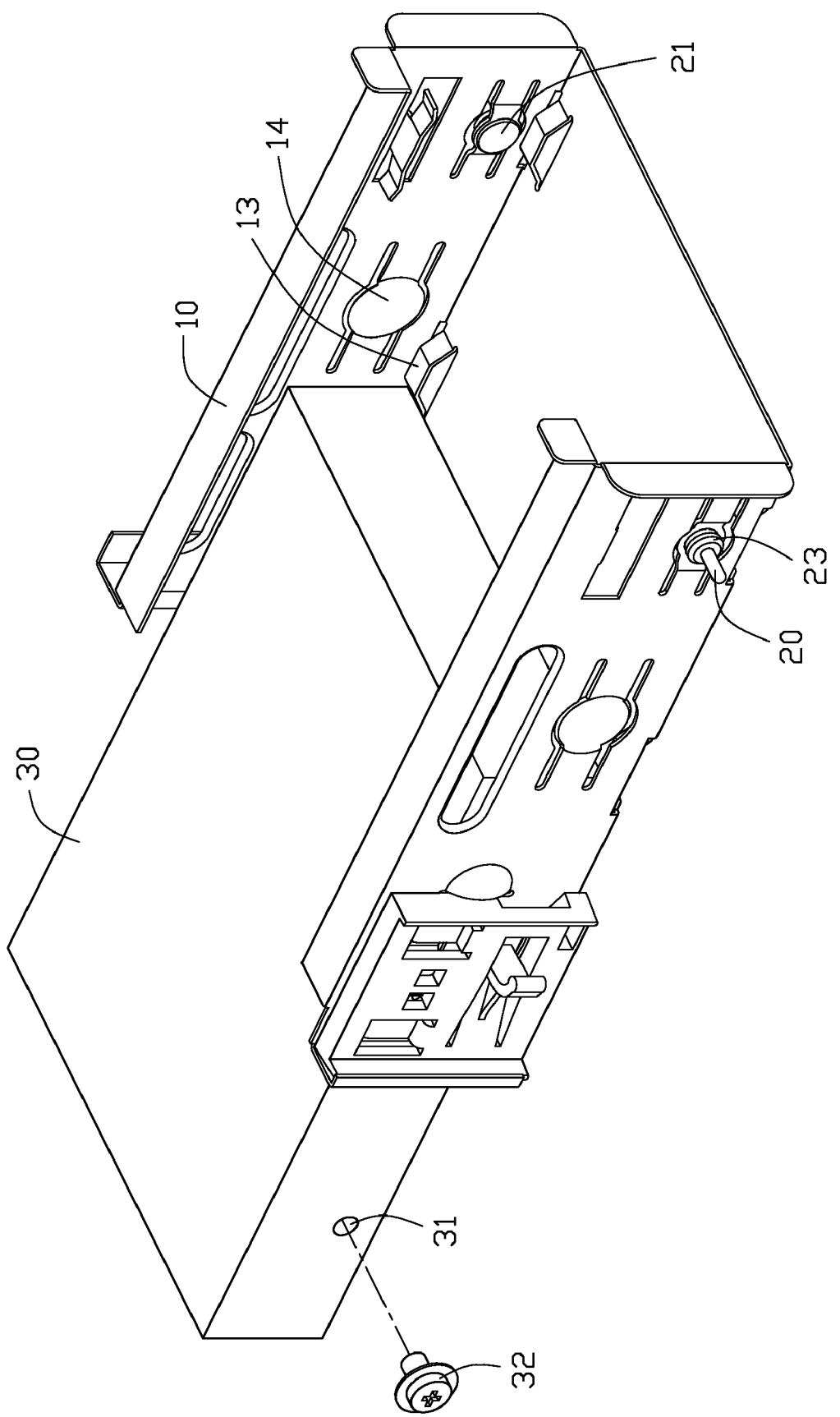
FIG. 4 is an isometric view of the vibration dampening structure in the process of mounting the disk drive in the bracket.

Referring to FIG. 4, a disk drive 30 is mounted in the bracket 10. A pair of recesses 31 is defined in two sides of the disk drive 30. A screw 32 extends into the recess 31. The screw 32 is inserted into the guide way 16 and pushed against the resisting portion 171. The resisting portion 171 is deformed outwardly so that the screw 32 can be slid into the guide way 16. The resisting portion 171 then returns to a normal state to prevent the disk drive 30 from sliding out. In the process of assembling the disk drive 30, the disk drive 30 is firmly fixed in the bracket 10 by the support 13 and the protrusion 14.

The elastic peg 20 is inserted into the hole 151 of the clamp 15 from the inner side of the bracket 10. The head portion 21 of the elastic peg 20 lies on the inner side of the bracket 10. The neck portion 22 is inserted in the hole 151. The flange portion 23 lies on the outer side of the bracket 10.

Figure 5:
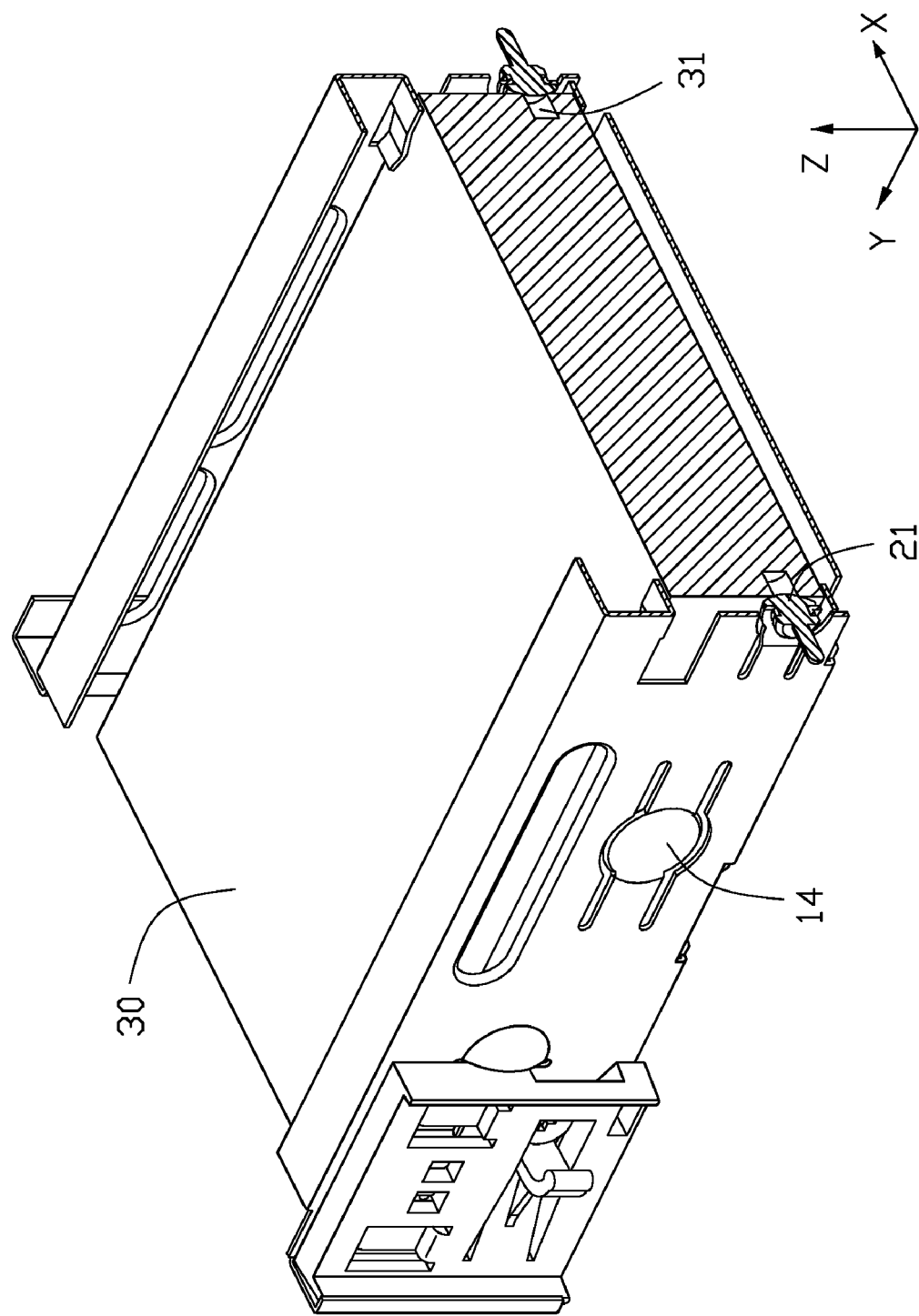
FIG. 5 is a sectional view of the vibration dampening structure after the disk drive is mounted in the bracket.
Figure 6:
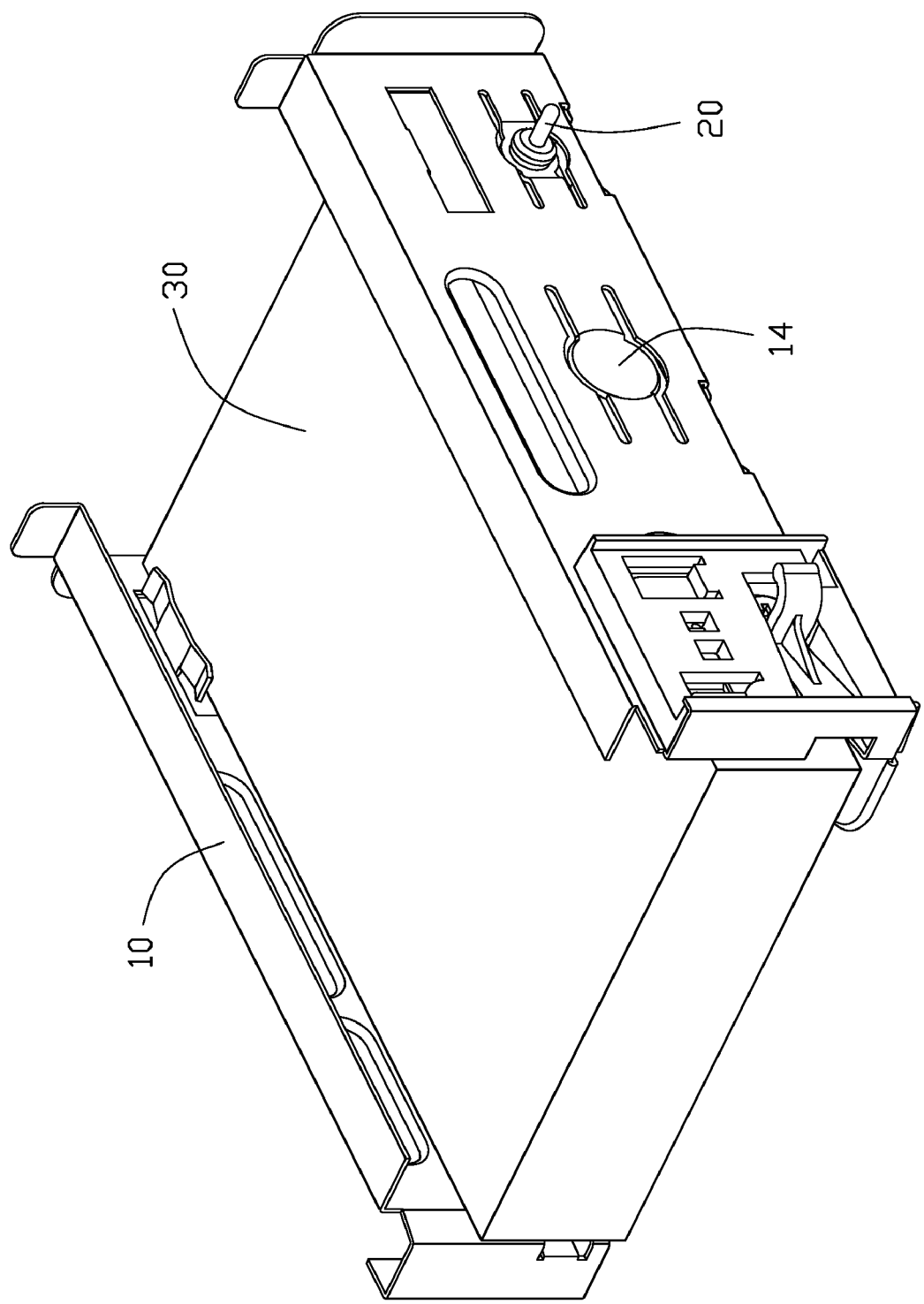
FIG. 6 is an assembled view of the vibration dampening structure and the disk drive.

Referring to FIG. 5 and FIG. 6, when the disk drive 30 is completely mounted in the bracket 10, the head portion 21 of the elastic peg 20 engages with the recess 31 to dampen the vibration produced by the disk drive 30. The elastic peg 20 blocks the disk drive 30 and dampens vibration at an X-direction along the extension of the elastic peg 20. A Y-direction and a Z-direction substantially perpendicular to the bottom panel 11 of the bracket 10 are restricted by an engagement of the head portion 21 and the recess 31.

When disassembling the disk drive 30 from the bracket 10, the handle portion 24 of the elastic peg 20 is pulled outwards. The head portion 21 and the clamp 15 move away from the disk drive 30, thereby disengaging the disk drive 30 from the head portion 21 of the elastic peg 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A vibration dampening structure for a disk drive, the vibration dampening structure comprising:
   a bracket to receive the disk drive, the bracket comprising a pair of side panels to receive the disk drive therebetween, an elastic clamp being formed on each side panel, a hole defined in the clamp; and
   an elastic peg to dampen vibration of the disk drive, the elastic peg comprising a flexible head portion abutting the disk drive, and a handle portion extending into the hole, the head portion buffering the disk drive in an inner side of the bracket, and the handle portion being capable of being pulled to move the head portion and the clamp away from the disk drive to disengage the elastic peg from the disk drive.

2. The vibration dampening structure of claim 1, wherein the head portion has a convex shape facing the disk drive.

3. The vibration dampening structure of claim 2, wherein the head portion is spherical-shaped.

4. The vibration dampening structure of claim 1, wherein a recess is defined in the disk drive to engage with the head portion.

5. The vibration dampening structure of claim 1, wherein the bracket further comprises a bottom panel; at least one curved support is formed on the bottom panel to support the disk drive.

6. The vibration dampening structure of claim 1, wherein a circular protrusion is formed on each side panel to position the disk drive in the bracket.

7. The vibration dampening structure of claim 1, wherein the elastic peg further comprises a flange portion blocking on the outer side of the side panel and a neck portion connecting the flange portion with the head portion.

8. The vibration dampening structure of claim 7, wherein a width of the neck portion is substantially equal to a diameter of the hole.

9. The vibration dampening structure of claim 1, wherein a width of the head portion is larger than a diameter of the hole.

10. The vibration dampening structure of claim 1, wherein the clamp is formed between two grooves such that a middle portion of each clamp is capable of being elastically deformed perpendicular to the side panels.

11. A vibration dampening structure for holding a disk drive, two recesses are defined in opposite sides of the disk drive, the vibration dampening structure comprising:
   a bracket to receive the disk drive, the bracket comprising a bottom panel and a pair of side panels to receive the disk drive therebetween, an elastic clamp formed on each side panel; and
   a flexible member to dampen vibration of the disk drive in the bracket, the flexible member being attached to the clamp, the flexible member comprising a head portion capable of executing a resilient force to the disk drive to dampen vibration at a first direction of the extension of the flexible member;
   wherein when the disk drive is vibrating in the bracket, the flexible member provides resilient forces to the disk drive, the vibration is dampened by an engagement of the recess and the head portion at a third direction substantially perpendicular to the bottom panel of the bracket, and a second direction substantially perpendicular to the first direction and the second direction; and
   an elastic peg to dampen vibration of the disk drive, the elastic peg comprising a flexible head portion abutting the disk drive, and a handle portion extending into the hole, the head portion buffering the disk drive in an inner side of the bracket, and the handle portion being capable of being pulled to move the head portion and the clamp away from the disk drive to disengage the elastic peg from the disk drive.

12. The vibration dampening structure of claim 11, wherein the head portion has a convex shape facing to the disk drive.

13. The vibration dampening structure of claim 12, wherein the head portion is spherical-shaped.

14. The vibration dampening structure of claim 11, wherein at least one curved support is formed on the bottom panel to buffer the disk drive.

15. The vibration dampening structure of claim 11, wherein a circular protrusion is formed on each side panel to position the disk drive in the bracket.

16. The vibration dampening structure of claim 11, wherein the flexible member further comprises a flange portion blocking on the outer side of the side panel and a neck portion connecting the flange portion with the head portion.

17. The vibration dampening structure of claim 16, wherein a width of the neck portion is substantially equal to a diameter of the hole.

18. The vibration dampening structure of claim 11, wherein a width of the head portion is larger than a diameter of the hole.

19. The vibration dampening structure of claim 11, wherein the clamp is formed between two grooves such that a middle portion of each clamp is capable of being elastically deformed perpendicular to the side panels.

* * * * *